Sept. 19, 1939.  H. THOMSEN  2,173,217
SUPPORT FOR PLANTS
Filed July 3, 1936

H. Thomsen
Inventor

By: Glascock Downing & Seebold
Attys.

Patented Sept. 19, 1939

2,173,217

UNITED STATES PATENT OFFICE 2,173,217

SUPPORT FOR PLANTS

Hans Thomsen, Altona-Blankenese, Germany

Application July 3, 1936, Serial No. 88,898

4 Claims. (Cl. 47—47)

This invention relates to a support for plants or flowers of metal wire or other suitable wire shaped material, and has for its object to provide improved plant supporting means, whereby the use of the troublesome and ugly stakes to which plants are tied by means of twine or raffia may be avoided.

Plant supports as heretofore proposed consist mostly of rings fixed to a carrier rod either centrally by means of a hub like member and radial spokes, or at their circumference. It is also known to provide for strawberry plants holders rising helically from the ground level.

Another object of the invention is to provide a very simple plant holder suitable for use in connection with many different kinds of plants and easily placed in position.

A further object is to provide a plant holder which will enable the stems of the plants to be supported in any desired arrangement.

According to the invention, the plant supporting device comprises a flat, spirally wound plant holder proper and means for rotatably maintaining same in a substantially horizontal position.

The stem or stems of the plant are located and held apart by the convolutions of the spiral and by rotation thereof may be caused to approach or recede from the centre of the plant or one another, so that shoots, stems or stalks of plants may be neatly, securely and naturally supported.

Various embodiments of the device according to the invention are illustrated by way of example in the accompanying drawing, wherein—

Figure 1:
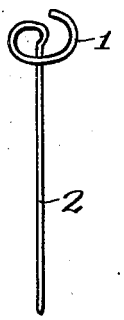
Figure 2:
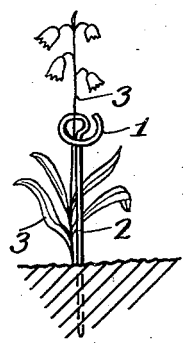
Figure 3:
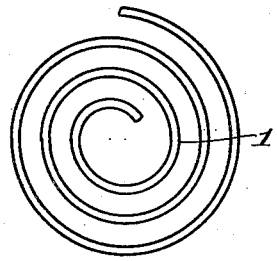
Figure 4:
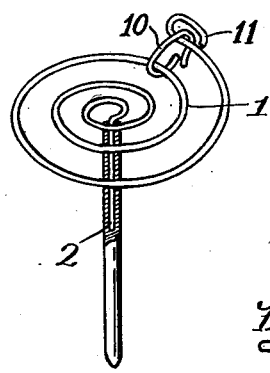
Figure 5:
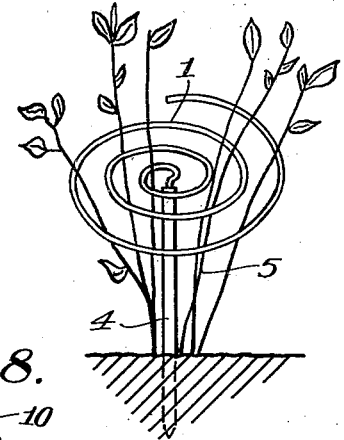
Figure 6:
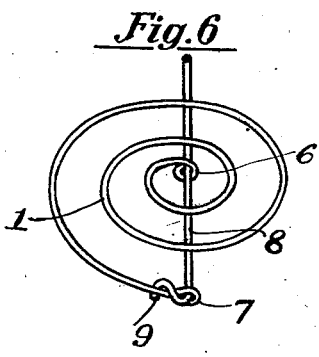
Figure 7:
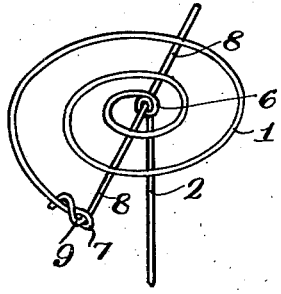

Figs. 1 and 2 show a form of the device suitable for supporting a single stem or shoot, Fig. 1 being a perspective view of the device by itself and Fig. 2 a similar view with the device in use, Fig. 3 is a plan view of the spiral plant holder proper, Fig. 4 is a perspective view partly in section of another embodiment, Fig. 5 is a similar view of the same embodiment in use, Fig. 6 is a perspective view of the spiral plant holder proper, incorporating a diametral stiffening member, Fig. 7 illustrates the same device in perspective, while Fig. 8 a locking element for the spiral holder part.

Referring to Figs. 1 and 2, the spiral plant holder proper indicated at 1 has one convolution and is formed integral with a stem portion 2, adapted to be inserted into the ground and to hold the spiral in a substantially horizontal position. The single shoot of the plant 3 may be caused to be drawn into the centre part of the spiral 1 by the rotation thereof together with the stem 2.

Referring to Figs. 3, 4 and 5, the spiral has a plurality of convolutions, say three. In this embodiment the stem 2 is adapted to be inserted into an axial bore of a stake 4, which is inserted into the centre of the crown of a plant 5 having a plurality of shoots, or into the ground close beside the crown. By the rotation of the spiral 1 together with its stem 2 in the bore of the stake 4 the various shoots of the plant may be caused one by one to be drawn in between the convolutions of the spiral and to be held thereby in the desired relationship.

Fig. 4 also shows means for closing the open end of the spiral 1. Such means comprise a connecting link 10 adapted to be hooked into an eye 11 formed at the outer end of the spiral, and then to be hooked around the adjacent convolution to assume the position illustrated in Fig. 4.

In the embodiment shown in Fig. 6, the spiral 1 has respective eyes 6 and 7 at its inner and outer ends, through which a rod 8 is thrust, which extends diametrally right through the spiral and serves as a support for the convolutions thereof. The rod 8 is formed at one end with a hook 9, so arranged that when the rod inserted into the eyes 6 and 7 is suitably turned the hook engages the portion of the spiral adjacent the eye 7, whereby the supporting rod 8 is detachably connected to the spiral 1. If the spiral is formed integral with a stem 2, as in Fig. 7, the inner eye 6 is given a loop form and is continued in the stem 2.

Fig. 8 shows the closing member 10 illustrated in operative position in Fig. 4 in side elevation. The member consists of an elongated link, the ends 12 of which are inclined to the plane of the link and are parallel to one another, so that a gap is formed therebetween, whereby it may be hooked around adjacent convolutions of the spiral to be connected together.

According to whether plants with long shoots without side shoots, or plants having a plurality of side shoots are to be supported, spiral holders with or without a stem 2 may be employed. In the case of holders without a stem the holder is maintained in vertical relation by the side shoots of leaf stems of the plant. The spacing of the shoots of a plant with reference to one another may be adjusted by the rotation of the holder, which causes the shoots to be displaced more or less towards or away from the centre, whereby the plant may be given any desired more or less bunched appearance. At the same time the shoots held by the various convolutions are prevented from being pressed together or torn apart by rain or wind. For plants having one shoot only a support having a spiral with one convolution (Figs. 1 and 2) is sufficient. According to the size of the plant or the number of its shoots the number of convolutions of the spiral 1 may be increased at will. Likewise, the distance apart of the individual convolutions may be varied in accordance with the actual purpose for which the plant support is to be utilized. Moreover, the spiral 1 may be inclined to the horizontal or disposed in any other position to suit the plant in question.

The spiral 1 is held in the desired vertical position by the stem 2 and/or the stake 4. The most suitable material for the stake is the well known bamboo cane widely used for staking plants, this being hollow by nature. The diametral wire 8 prevents the hanging down of the outer convolutions of large size holder having a plurality of convolutions, all of these resting upon the diametral wire 8 thrust through the eyes 6 and 7, the wire 8 engaging with its hooked end 9 in an inward direction the part of the spiral 1 adjacent the eye 7. The diametral member 8 thus also acts as a closing member for the spiral, so that the shoots engaging the outermost convolution cannot become disengaged therefrom. Instead of this diametral member 8 the spiral 1 may also be closed by the detachable closing member 10 illustrated in Figs. 4 and 8, which connects two or more adjacent convolutions and is first hooked into the eye formed at the outer end of the spiral and then, under temporary compression of the spirals, is caused to engage the next convolution. The spiral 1, the stem 2 and the diametral member 8, or the closing member 10 for two spiral convolutions are preferably made of corrosion resisting wire, or wire provided with a rust protective coating.

I claim:

1. A plant supporting device, comprising a flat, spirally wound plant holder proper, a stem integral therewith and extending centrally therefrom at right angles to the plane thereof and a stake member adapted to be inserted into the ground at one end and having an axial bore at the other end for the reception of said stem.

2. A plant supporting device, comprising a flat, spirally wound plant holder proper formed with respective loops at its inner and outer ends, a spiral supporting member adapted to be thrust into said loops and extending diametrally under all convolutions of the spiral and means for rotatably maintaining the plant holder proper in a substantially horizontal position.

3. A plant supporting device, comprising a flat, spirally wound plant holder proper formed with respective loops at its inner and outer ends, a spiral supporting member adapted to be thrust through said loops and to extend diametrally under all convolutions of the spiral, a hook formed at one end of said supporting member and adapted to engage the portion of the spirally wound plant holder member adjacent the outer loop thereof and means for rotatably maintaining the plant holder proper in a substantially horizontal position.

4. A plant supporting device comprising a supporting member formed from a single piece of wire bent to form a series of spiral convolutions of increasing diameter and arranged in a substantially single horizontal plane, said member being adapted for arrangement about the main and branch stems of a plant for maintaining the same in substantially upright position and spaced from each other at a distance above the ground, and means associated with the outer end of the outermost convolution and engageable with an adjacent part of the supporting member so as to facilitate the maintenance of the supporting member in a horizontal plane.

HANS THOMSEN.